April 5, 1955    E. KREISSIG ET AL    2,705,605
PIT-PROP LOCK
Filed Sept. 15, 1950

United States Patent Office 2,705,605
Patented Apr. 5, 1955

2,705,605
PIT-PROP LOCK

Ernst Kreissig, Wilhelm Schaefer, Bernhard Remfert, Hans Edelmeier, and Walter Müller, Krefeld-Uerdingen, Germany Application September 15, 1950, Serial No. 185,011
Claims priority, application Germany September 26, 1949

5 Claims. (Cl. 248—354)

This invention relates to steel pit-props which may be employed to support the roof in the working of coal mines. More particularly, the invention relates to pit-props having two strut-like parts, one of which can telescope within the other. Such pit-props are adjusted to the required overall length and the two strut-like parts are then secured to each other by means of a locking device.

Hitherto in such pit-props, wedge connecting members have almost always been employed to form the retaining device or clamping lock which secures the two parts of the prop against yielding, even under high pressure, when they have been set to a predetermined overall length.

A pit-prop which is made in accordance with the present invention, has a locking device, which is readily operable by hand even under the highest forces, and which permits convenient withdrawal of the prop from a distance, even under unfavourable conditions, while having great retaining strength. In pit props, known locking devices, comprising sliding wedges and the like, in conjunction with a slightly conical upper prop element have the object of transmitting the propping force by friction to the lower prop element, for which purpose a certain sinking in movement of the upper element is necessary. Since such movement-controlled friction devices may fluctuate considerably in their capacity for taking up force owing to the different friction conditions arising, this principle is abandoned in the present invention. In the present locking device a spring acts, for example, on a spit nut or segments, the internal contours of which may comprise screw-threads, recesses or projections, which act on correspondingly fashioned co-operating parts. The spring may be variously fashioned, for example, as a spiral spring, or as a ring spring. It is an additional advantage of the ring-spring that it is possible to construct the ring simultaneously as a housing. The split nut or segments may be subjected, by one or more springs, to a force so directed as to have a loosening tendency. The recoil force of the spring may be transmitted by a pin and a cam disc to the connecting part, the pin being within the housing and when the connection is established, also within the connecting part. In order to keep the wear on the projections of the segments and connecting parts low, it is further proposed to make the inter-engaging arts so different in size and in strength that high retaining strength is ensured even when the locking device is loosened under great force. The present locking device is distinguished as compared with the known lock by the fact that said locking device may be easily closed, and closed in a shorter time than has hitherto been possible. It is consequently no longer necessary, as in the case of constructions comprising wedge connecting means hitherto normally employed, to strike the wedge with sledge hammers or the like.

With the increasing introduction of mechanical coal cutting, these advantages and the saving of time afforded thereby are particularly important. Moreover, the present locking device comrising the means which have already been mentioned affords the advantage that loosening can readily be effected with the expenditure of less energy and consequently also from a distance even under heavy loads.

For a better understanding of the nature of the invention and to show how the same may be carried into effect, two constructional forms thereof will now be referred to in greater detail, with reference to the accompanying drawings in which.

Figure 1:
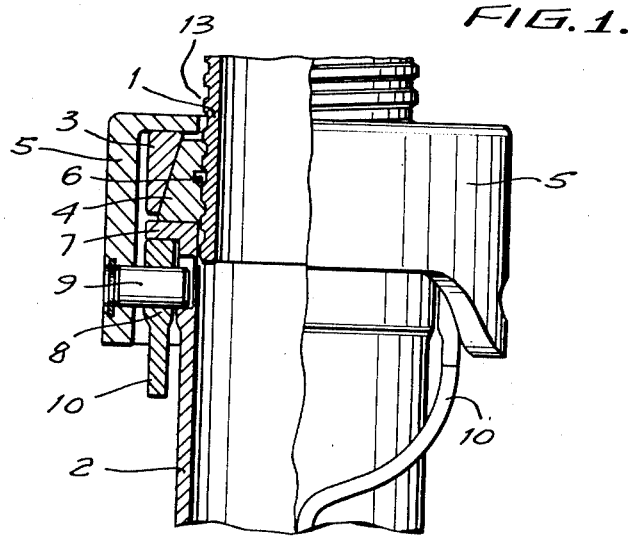
Figure 1 is a side view, partly sectioned, of part of one form of a pit-prop.
Figure 3:
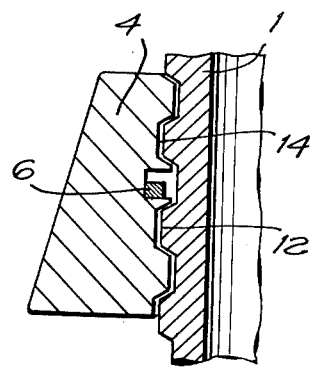
Figure 3 is a detail view in axial section.

The pit-prop in Figure 1 consists of an upper tubular prop element 1 and a lower tubular prop element 2. A ring spring 3 bears on the segments 4 or on a split nut. The spring 3 is surrounded by a housing 5. Spring rings 6 serve to maintain on the segments 4, a force acting in such a direction as to have a loosening tendency. The inner surfaces of the segments 4, or of the split nut, have recesses 14 which engage with complemental surfaces 12 on the upper tubular element 1. The segments 4, or split nut, bear against a collar 7 on the element 2. Situated below the collar 7 is a cam disc, or eccentric 8, which is mounted on a pin 9 journalled in the housing 5 or 11 and which can be rotated by a hand lever 10 integral therewith. As seen in the drawing, the hand lever 10 engages both pins 9.

Figure 2:
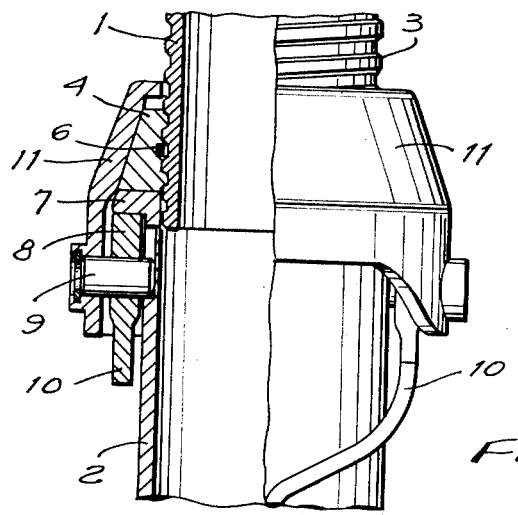
Figure 2 is a side view, partly sectioned, of another form of pit-prop.

The constructional form shown in Figure 2 differs from that of Figure 1 in that the ring spring 3 is fashioned as a housing 11.

When the cam disc or eccentric 8, bearing against the collar 7 is turned about the pin 9 by lowering the hand lever 10, the housing 11, or the housing 5, as the case may be is moved downwardly by the action of the eccentric. The ring spring 3, or the housing 11, rides over the locking segments 4, and wedges the latter against the tubular element 1, the internal contours of the segments coming into engagement with the external contours of the tube (screw thread, groove or the like). The ratio of the force applied to the housing and the cam disc to the propping force is determined by the selection of the inclinations of the conical surfaces between the ring spring 3, or housing 11, and the segments 4 on the one hand, and the form of the recesses in the tube 1 and the segment 4 on the other hand indicated diagrammatically at 13 in Figures 1 and 2.

We claim:

1. A quick release locking device for use with telescopically engaged upper and lower members comprising means defining a profiled external surface on one of said members including portions defining successive ribs and grooves, a split nut having a profiled internal surface complementary to the external surface of said member, an actuating handle journalled on the other of said members, cam means actuatable by said handle to cause axial movement of said split nut, and cam means surrounding said split nut to cause radial inward movement thereof and engagement of said complementary surfaces concurrently with said axial movement.

2. The combination claimed in claim 1 further comprising an outwardly biassed spring positioned between said split nut and upper member to cause disengagement of said complementarily profiled surfaces upon release of said locking means.

3. The combination claimed in claim 1 comprising a pivot pin for said first cam means journalled in the upper end of the lower one of said members and supporting said locking device.

4. The combination claimed in claim 1 comprising an external flange on the upper end of the lower one of said members, a housing surrounding said split nut and flange, and an internal flange in said housing directed toward said upper member, said split nut being positioned between said two flanges.

5. The combination claimed in claim 4 wherein said housing is of spring material.

References Cited in the file of this patent
UNITED STATES PATENTS

| | | |
|---|---|---|
| 531,798 | Hoffman | Jan. 1, 1895 |
| 759,270 | Grier | May 10, 1904 |
| 782,595 | Bulger | Feb. 14, 1905 |
| 1,747,782 | Mahan | Feb. 18, 1930 |
| 2,167,888 | Hillbert | Aug. 1, 1939 |
| 2,335,721 | Zagar | Nov. 30, 1943 |
| 2,383,156 | Phillips | Aug. 21, 1945 |
| 2,504,392 | Carter | Apr. 18, 1950 |
| 2,553,838 | Allen | May 22, 1951 |